（12）United States Patent
Brewer et al.

(10) Patent No.: US 6,982,931 B2
(45) Date of Patent: Jan. 3, 2006

(54) TIMEPIECE

(75) Inventors: Donald R. Brewer, Dallas, TX (US); Diarmiud John St. Colum Bland, Garland, TX (US)

(73) Assignee: Fossil, Inc., Richardson, TX (US)

( * ) Notice: Subject to any disclaimer, the term of this patent is extended or adjusted under 35 U.S.C. 154(b) by 378 days.

(21) Appl. No.: 10/087,245

(22) Filed: Mar. 1, 2002

(65) Prior Publication Data

US 2003/0165085 A1    Sep. 4, 2003

(51) Int. Cl.
G04B 19/04    (2006.01)
G04B 19/06    (2006.01)
G04C 19/00    (2006.01)
G04C 17/00    (2006.01)

(52) U.S. Cl. ................... 368/80; 368/84; 368/223; 368/228; 368/232; 349/96; 349/113

(58) Field of Classification Search .............. 368/80, 368/84, 223, 228, 232, 234, 239–242; 349/56, 349/84, 96–98, 104–106, 113–114, 117
See application file for complete search history.

(56) References Cited

U.S. PATENT DOCUMENTS

| 4,227,777 A | * | 10/1980 | Murakami | ................ 350/334 |
| 5,636,185 A | | 6/1997 | Brewer et al. | |
| 5,828,488 A | | 10/1998 | Ouderkirk et al. | |
| 5,995,456 A | | 11/1999 | Brewer et al. | |

(Continued)

FOREIGN PATENT DOCUMENTS

| EP | 0 825 477 A2 | 8/1997 |
| EP | 0926574 A | 6/1999 |
| EP | 0927917 A | 7/1999 |

(Continued)

OTHER PUBLICATIONS

"Display Technology: About reflective LCD." Accessed Dec. 14, 2001. IBM: Jun. 30, 1998. <http://www.trl.ibm.com/projects/reflcd/ref_expe.htm>.

Agamanolis, Stefan. "Liquid Crystal." Accessed Dec. 13, 2001. Updated May 18, 1995. <http://stefan.www.media.mit.edu/people/stefan/liquid–crystals/node2.html>.

"Liquid Crystals." Accessed Dec. 13, 2001. <http://liq–xtal.cwru.edu/lcdemo.htm>.

"Introduction to Liquid Crystals." Accessed Dec. 13, 2001. <http://www.eng.ox.ac.uk/lc/research/introf.html>.

Petersson, Bjorn, and Mikael Seppala. "LCD Liquid Crysta Display." Report in Optoelectronics. Feb. 28, 2001.

"Display Technologies".

*Primary Examiner*—Vit W. Miska
(74) *Attorney, Agent, or Firm*—David W. Carstens; Carstens Yee & Cahoon, LLP (57) ABSTRACT

A watch face uses liquid crystal displays along with a reflective polarizer to produce backgrounds with selective appearances. Therein, the watch employs a polarizer to produce polarized light that is passed downward to a liquid crystal display. The liquid crystal display selectively rotates or does not rotate the polarized light. If the light is rotated, a reflective polarizer layer located beneath the liquid crystal display reflects the rotated light back upward off its surface to provide the watch face with a first color. If the light is not rotated, then the light is transmitted through the reflective polarizer layer to a reflective dial surface disposed beneath. The light is then reflected off the dial surface to provide the watch face with a second color. The present invention includes a watch employing a watch face with selectively changing backgrounds which is capable of displaying two or more colors while having a watch face that has reduced overall thickness and can be made to display unique optical effects and patterns.

61 Claims, 10 Drawing Sheets

U.S. PATENT DOCUMENTS

| | | | |
|---|---|---|---|
| 6,008,871 A | 12/1999 | Okumura | |
| 6,141,068 A * | 10/2000 | Iijima | 349/96 |
| 6,147,934 A * | 11/2000 | Arikawa et al. | 368/84 |
| 6,271,901 B1 * | 8/2001 | Ide et al. | 349/96 |
| 6,462,724 B1 * | 10/2002 | Ozawa et al. | 345/87 |
| 6,515,942 B2 * | 2/2003 | Basturk | 368/223 |
| 6,587,399 B2 * | 7/2003 | Basturk | 368/84 |

FOREIGN PATENT DOCUMENTS

| | | |
|---|---|---|
| EP | 0933663 A | 8/1999 |
| JP | 50-102289 | 8/1975 |
| JP | 52-48369 | 4/1977 |
| JP | 6-230371 | 8/1994 |
| JP | 11118963 A | 4/1999 |
| JP | 11-194359 | 7/1999 |
| JP | 11-242087 | 9/1999 |
| JP | 11-316558 | 11/1999 |
| JP | 2000-111940 | 4/2000 |
| JP | 2000-298273 | 10/2000 |
| JP | 2000-304884 | 11/2000 |
| JP | 2000-310774 | 11/2000 |
| JP | 2001-296546 | 10/2001 |

* cited by examiner

TIMEPIECE

BACKGROUND OF THE INVENTION

1. Technical Field of the Invention

The present invention generally relates to an improved timepiece module, also called a watch, or other device having a display. More specifically, the present invention relates to an improved electronic timekeeping apparatus which features improved ergonomic and design functionality, namely, a dynamically changing liquid crystal display that allows electronically controlled color change of the liquid crystal display elements, a novel arrangement of timepiece components resulting in a significant reduction the thickness, and an improved numeric display.

2. Description of Prior Art

A wide variety of electronic timepieces utilizing liquid crystal display elements for time indication have been developed with great commercial success. Most of these electronic timepieces indicate the time in the form of numerals or in what is often referred to as a digital time display. More recently, the related art have fashioned liquid crystal displays for electronic watches that represent time in an analog or conventional type form.

Many existing liquid crystal displays used in timepieces utilize conventional twisted-nematic (TN) displays that generally have a black on gray appearance. In addition, polarizing films, both external and reflective, are typically incorporated within such devices which tend to diminish the brightness of the display and limit the viewing angles at which the display are clearly visible. Color appearance of the liquid crystal display is introduced through the use of colored filters, colored background lighting, and the like. However, when the appearance of color is incorporated with such timekeeping devices, the colors are often preselected and static.

The concept of having a color changing LCD is taught in U.S. Pat. Nos. 5,636,185 and 5,995,456 both issued to Brewer et al. on Jun. 3, 1997 and Nov. 30, 1999, respectively. Therein, both disclose having an LCD display incorporated within a watch or other apparel item that can be adapted to provide various colored images on colored backgrounds or alternatively providing a color changing capability that is aesthetically pleasing and fashionable. However, these patents do not teach the technical details on using the new LCD methodologies and solutions to achieve an improved color appearance or expanded color-changing capabilities.

U.S. Pat. No. 5,828,488 issued to Ouderkirk et al. on Oct. 27, 1997 discloses a reflective polarizer display. The particular material is know as a reflective polarizer material and used instead of an absorptive back polarizer in a conventional LCD configuration. However, no teaching is provided for using the material for producing a color changing background for watches or other apparel.

Figure 1:
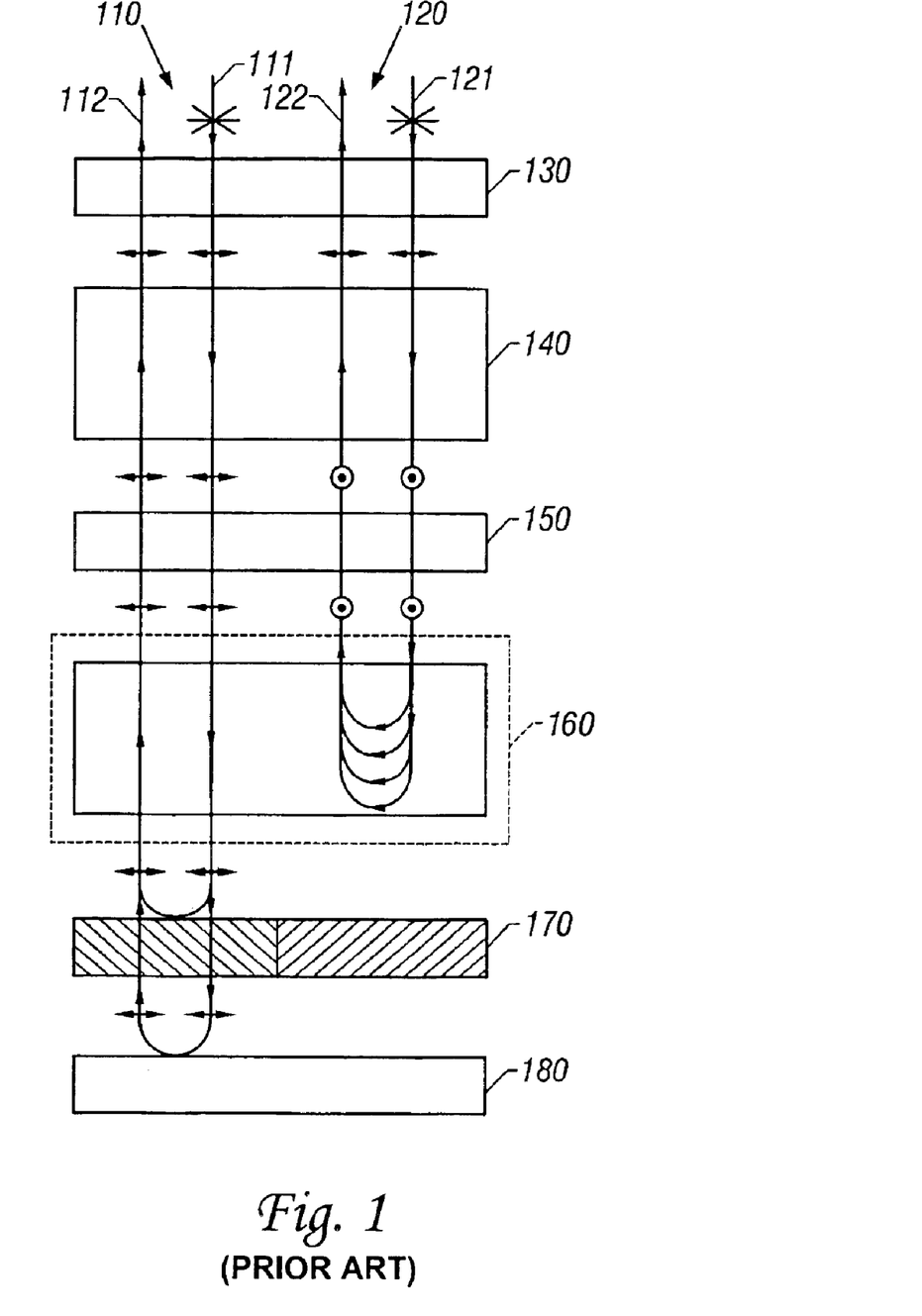
FIG. 1 is a schematic side view of a prior art display device.

A display device utilizing the reflective polarizer material of the '488 patent is disclosed in EP 0 825 477 A2 published Feb. 2, 1998. FIG. 1 discloses a prior art methodology of using a reflective polarizer in an LCD configuration to produce brighter colors by the inherent nature of the reflective polarizer material is taught. Therein, polarizer 130 is arranged above a twisted nematic (TN) liquid crystal 140, and a light-scattering layer 150, a polarized light separator 160, a coloring layer 170, and a reflecting plate 180 are arranged under TN liquid crystal 140. The polarizer light separator 160 transmits a linearly polarized light component in a direction parallel to the page being incident from the upper side, reflects a linearly polarized light component in a direction perpendicular to the page, and can upwardly emit linearly polarized light parallel to the page in response to light being incident from lower side. When voltage is not applied to liquid crystal 140 in a voltage not applied condition 120, incident light 121 is reflected by the polarized light separator 160 and becomes white emission light 122. In a voltage applied condition 110, incident light 111 is transmitted through polarized light separator 160 and is colored by coloring layer 170 to become color emission light 112. While the arrangement shown in FIG. 1 utilizes a reflective polarizer, no teaching is provided for its use for colored backgrounds for watches or other apparel.

In U.S. Pat. No. 6,008,871 issued to Okumura on Dec. 28, 1999 discloses a transflective liquid crystal display device using a reflective polarizer disposed on the opposite side of the liquid crystal panel as the polarizer. The '871 patent provides for devices having brighter displays. There is no teaching though to use the reflective polarizer to allow for the selection of colored backgrounds for watches or other apparel.

Improved ergonomics are essential to enhancing the interaction of humans with technologically advanced electronic devices. In particular, commonplace electronic devices, such as electronic timepieces, are increasingly becoming more complex and diverse in their functionality. Thus, the ability to accurately and rapidly convey discrete information is important to the design of any timepiece. Nevertheless, the consumer market also demands that such increased complexity and functionality not detract from the comfort, ease of use, or fashion elements. Thus, it is equally important that a watch be comfortable to wear as it is functional to use, and fashionable. Moreover, in the fashion watch market, success is based on giving the customer low priced watches that allow them to match different watches to different outfits. The sales potential in this market for a comfortable and functional watch that can display changing colored segments or simply a watch dial that could change based on preprogrammed electronics or at the whim of the customer is thought to be very strong.

SUMMARY OF THE INVENTION

The present invention addresses many of the shortcomings of the prior art watch technology. The present invention includes a watch employing a watch face with selectively changing backgrounds which is capable of displaying two or more colors while having a watch face that has reduced overall thickness and can be made to display unique optical effects and patterns.

Particularly, the invention utilizes a watch face with selective backgrounds comprising a polarizer layer that polarizes light passing through to effectively allow about 50% of the light to be passed on toward the layers below. Beneath the polarizer is a liquid crystal display (LCD) that selectively rotates or does not rotates polarized light depending on whether the LCD is in an "OFF" or "ON" state, respectively. If the light is rotated, a reflective polarizer layer located beneath the LCD reflects the polarize light off the surface of the reflective polarizer layer thereby directing the light back upward to the surface of the watch face. This provides the watch face with a first color, which is namely a mirrored gray color in a first embodiment. If the light is not rotated, the light is then transmitted through the reflective polarizer layer and down toward the bottom of the watch face which is a reflective dial surface. The light reflected off of the dial surface is reflected back upward to the surface of the watch face and provides the watch face with a second color that is different from the first.

In another embodiment of the invention, a color changing layer is positioned between the LCD and the reflective polarizer layer. The color changing layer is comprised of either a colored polarizer or retardation film. In either case, the first color produced then is a color from the visible spectrum. The first color and second color are therefore different to provide a consumer with a watch having a watch face with selective backgrounds.

In another embodiment of the present invention, the utilization of dual LCD displays, arranged in tandem on top of one another, results in improved visual esthetics and ergonomics. In one variation of this embodiment, one LCD has the desired visual display segments, and the other LCD comprises a color changing background. In another variation of this embodiment, the second LCD further comprises a color changing background with visual display segments which match and fill in the attendant gaps between the visual display segments of the other LCD.

Additional display features can be added to the background in other embodiments. Patterns, logos, iridescent colors, three-dimensional textures or appearances, and other interesting optical effects can be added to the reflective dial surface. If the LCD used is an electronically controlled birefringence LCD, then numerous background colors are possible beyond just one or two.

Still another feature found in some embodiments of the present invention is a novel configuration of the internal components of the timepiece of the present invention result in a significant reduction in the thickness of the subject timepiece, thereby enhancing the comfort of the individual wearing the timepiece. The novel configuration is comprises positioning two smaller sized batteries alongside the PCB instead of the conventional arrangement whereby a larger battery is placed directly behind the PCB. This can allow for an overall thinner movement, and resulting thinner watch without detracting from the functionality of the watch.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF THE DRAWINGS

Figure 2A:
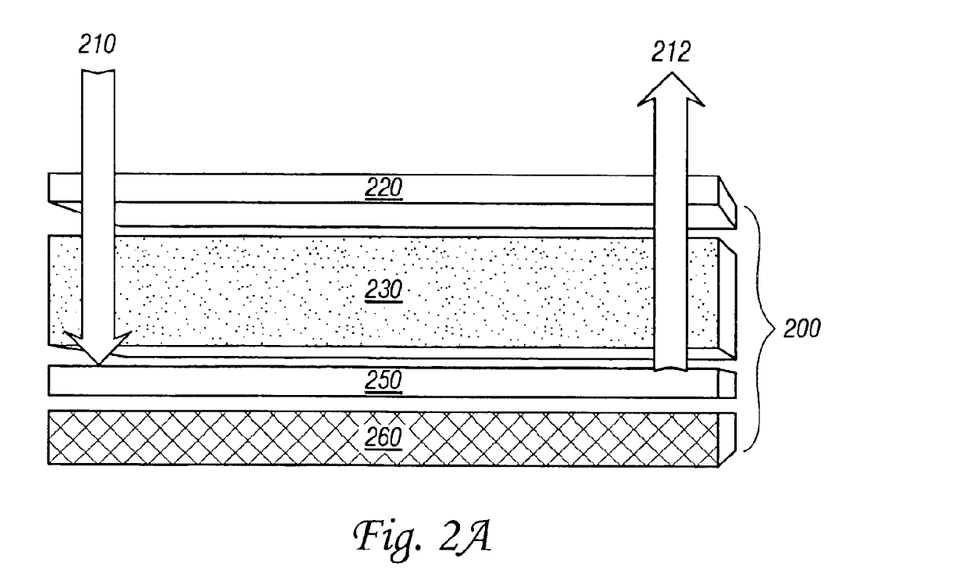
FIG. 2A is a vertical sectional view illustrating layers of a watch face having selectively changing backgrounds shown in accordance with an embodiment of the invention wherein the liquid crystal display in an "OFF" state.
Figure 2B:
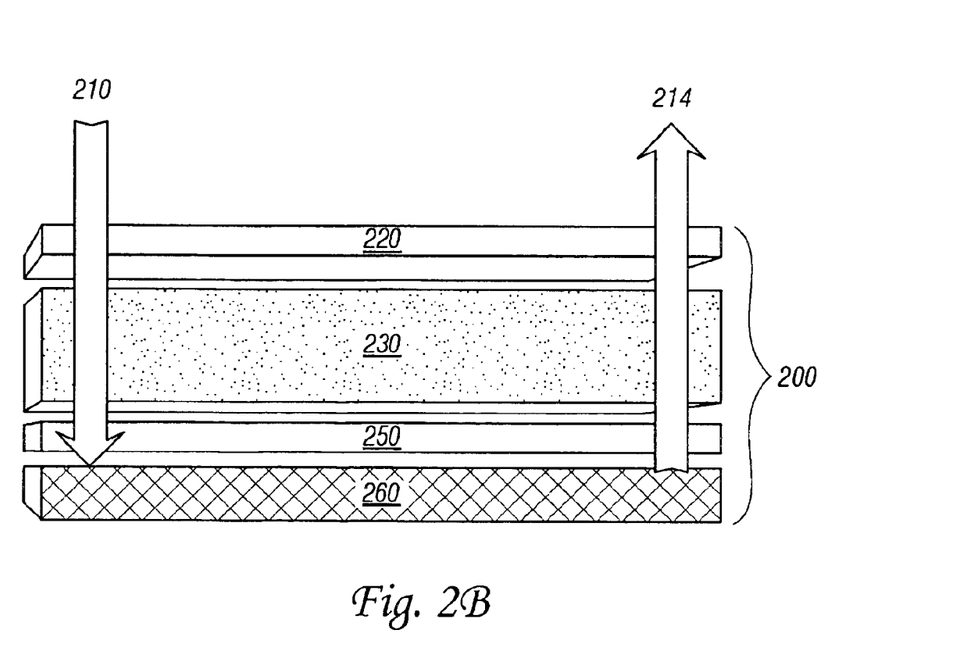
FIG. 2B is a vertical sectional view illustrating layers of a watch face having selectively changing backgrounds shown in accordance with an embodiment of the invention wherein the liquid crystal display in an "ON" state.

FIGS. 2A and 2B show one embodiment of the present invention for an improved color-changing LCD arrangement 200. With this improved arrangement 200, displays producing changeable color segments or a completely color changeable backgrounds are possible. This is particularly useful for timepiece backgrounds, particularly watch dial backgrounds.

In application, incident light 210 is directed toward arrangement 200. Depending whether arrangement 200 is in an "OFF" state wherein a first voltage is applied, as in FIG. 2A, or in an "ON" state wherein a second voltage is applied, as in FIG. 2B, incident light 210 is reflected from arrangement 200 as either a first or a second color. Specifically, when in the "OFF" state, incident light 210 is reflected as first color 212. When in the "ON" state, incident light 210 is reflected as second color 214.

As illustrated in FIG. 2A, to arrive at first color 212, incident light 210 is passed through arrangement 200 in the "OFF" state. The first layer of arrangement 200 is a polarizer layer 220. Polarizer layer 220 is comprised of material that causes the transmission of linearly polarized light of a predetermined first direction of incident light and absorbs linearly polarized light of a direction perpendicular to the linearly polarized light of the first direction. Polarizer layer 220 effectively allows about 50% of light to pass through onward toward the lower layers of arrangement 200. Specifically, the transmitted light passing through polarizer 220 is directed on toward liquid crystal display (LCD) layer 230.

LCD 230 comprises a polarized light axis changing element such as a twisted nematic (TN) liquid crystal. In the "OFF" state wherein a first voltage is applied to LCD 230, the now polarized incident light passes through LCD 230 and is twisted about 90 degrees to the predetermined first direction of the linearly polarized light.

The now twisted polarized light is then passed onward to a reflective polarizer film 250. Reflective polarizer film is discussed in detail by U.S. Pat. No. 5,828,488 issued to Ouderkirk et al. and is incorporated by reference herein. Essentially, the reflective polarizer transmits light having a first polarization orientation and reflects light having a different polarization orientation from the first. Therefore, light 210 passed through LCD 230 in the "OFF" state will be reflected off of the surface of film 250 as the orientation of the light is off from that of the reflective polarizer film 250. The reflected light is then passed back through to the surface of arrangement 200 as merely white light 212. Although white light 212 is not colored, it will appear as a mirrored background (i.e., silver) due to reflective polarizer film 250.

Referring now to FIG. 2B, with LCD 230 in the "ON" state wherein a second voltage is applied to LCD 230, the polarized light passing through LCD 230 will not be twisted as had occurred in the "OFF" state. As the LCD segments are turned on (i.e., a second voltage applied), they will then become parallel to the transmittance of the polarized light and will not rotate the light. Therefore, when the polarized light reaches reflective polarizer film 250, the orientation of the light will match the polarization of film 250 since the light has not been rotated and will pass through film 250 on to layer 260. Layer 260, which is disposed beneath film 250 in arrangement 200, is a patterned and/or colored surface such as a watch dial. The light passing through to layer 260 strikes the surface of layer 260. The light is then reflected back through the layers above to become colored light 214. The appearance and color of light 214 will be as the surface of layer 260 to an observer above arrangement 200. The color of layer 260 can comprise any color in the visual spectrum. Alternatively, layer 260 can have a textured design or logo imprinted thereon either alone or with a selected color.

Figure 3A:
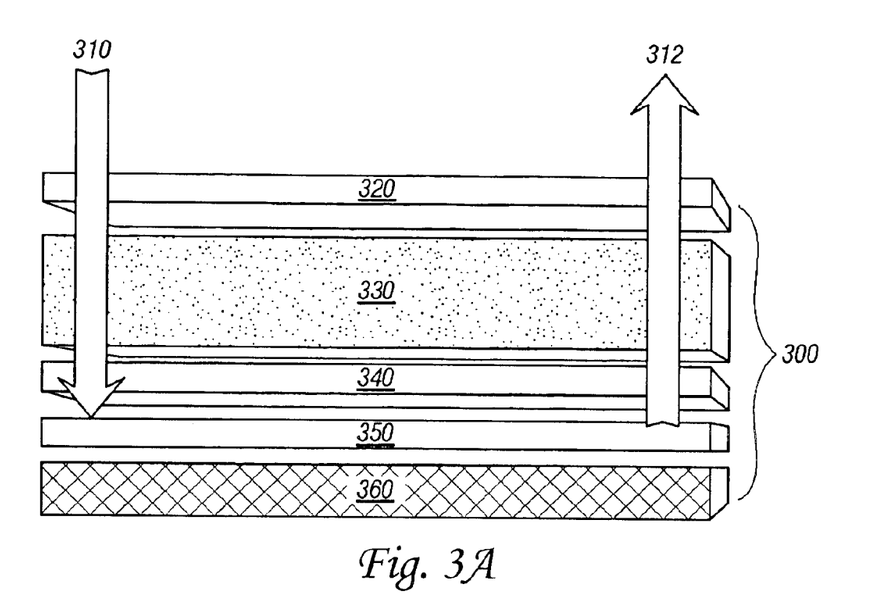
FIG. 3A is a vertical sectional view illustrating layers of a watch face having selectively changing backgrounds shown in accordance with an embodiment of the invention employing a color changing layer wherein the liquid crystal display in an "OFF" state.
Figure 3B:
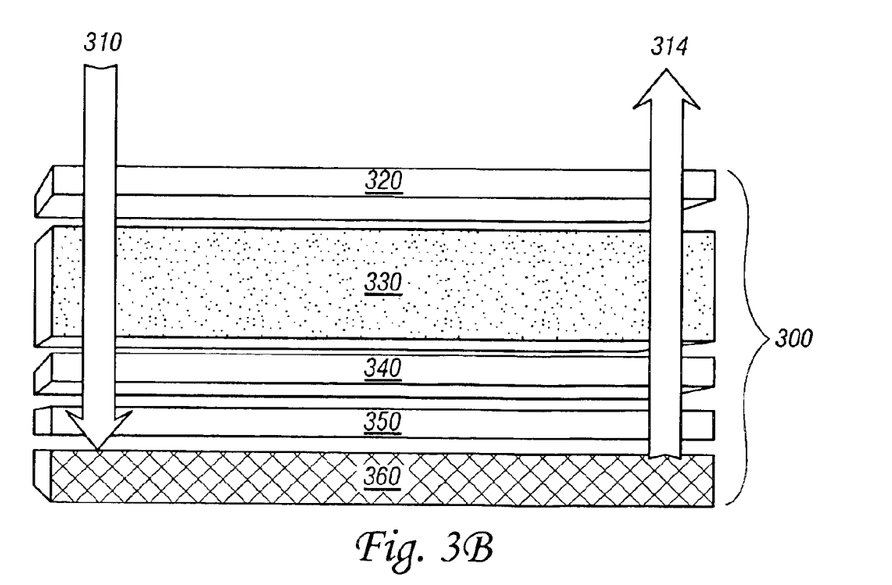
FIG. 3B is a vertical sectional view illustrating layers of a watch face having selectively changing backgrounds shown in accordance with an embodiment of the invention employing a color changing layer wherein the liquid crystal display in an "ON" state.

FIGS. 3A and 3B disclose an arrangement 300 that is similar to those in FIGS. 2A and 2B with the inclusion of an additional layer. This additional layer is a colored polarizer or retardation film 340. As with the examples discussed above, incident light 310 would pass through polarizer 320. Thereafter, the polarized light would pass on to LCD 330. In the "OFF" state wherein a first voltage is applied, as shown in FIG. 3A, LCD 330 twists the light about 90 degrees. Unlike the arrangement shown in FIG. 2A, the light is then passed through the colored polarizer or retardation film 340. Particularly, film 340 can comprise a colored retardation film for adjusting the optical phase difference of the light or a colored polarizer. With film 340, certain colored elements of light can be selectively absorbed and transmitted through to the succeeding layers. The light now reflects off of reflective polarizer film 350 and will project upwards toward the surface of arrangement 300 appearing as colored light 312, which matches the color of film 340.

In the "ON" state wherein a second voltage is applied to LCD 330, depicted in FIG. 3B, incident light 310 passes through polarizer 320 toward and through LCD 330 without its orientation being changed. The light is then passed through the colored polarizer or retardation film 340 with little color change toward reflective polarizer film 350. As the orientation of the light directed toward film 350 matches polarization of the film, the light is passed through to layer 360 striking the reflective surface of the layer. The light is then reflected back through the layers above to become colored light 314. The appearance and color of light 314 would be as the reflective surface of layer 360 to an observer above arrangement 300. With the addition of film 340, colored lights 312 and 314 can appear as different colors selected from the visual spectrum as opposed to having one state as no color (mirrored) and a second state as with color like in the examples described for FIGS. 2A and 2B. For example, the color of light 312 could appear blue and the color of light 314 could appear red.

In a variant of arrangement 300 of the embodiment, the orientation of the polarizer layers may be rotated in a conventional manner. Rather than a conventional positive display with dark segments on light background, this variant of arrangement 300 would appear as a negative display with light segments on a dark background. Using this variant of arrangement 300, polarizer layer 320, LCD layer 330, and bottom reflective polarizer 350 can be rotated with respect to each other so that incident light 310 passing through LCD 330 in the "OFF" state will have an orientation such that light 310 will pass through reflective polarizer film 350 to layer 360 to strike its reflective surface. Thereby, the light reflected to an observer in the "OFF" state will appear as light 314, which is the color and/or pattern of surface 360. In the "ON" state, light 310 will be reflected off of the surface of reflective polarizer film 350 to reflect light 312 to an observer.

This variant arrangement in the orientation of the polarizer layers can also be applied to the arrangement 200 shown in FIGS. 2A and 2B. Utilizing this variant arrangement with LCD 230 in the "OFF" state, light 214 would appear colored and/or patterned to an observer as light is being reflected from surface 260. With LCD 230 in the "ON" state, light 212 would appear mirrored from reflecting off of reflective polarizer film 250.

Figure 3C:
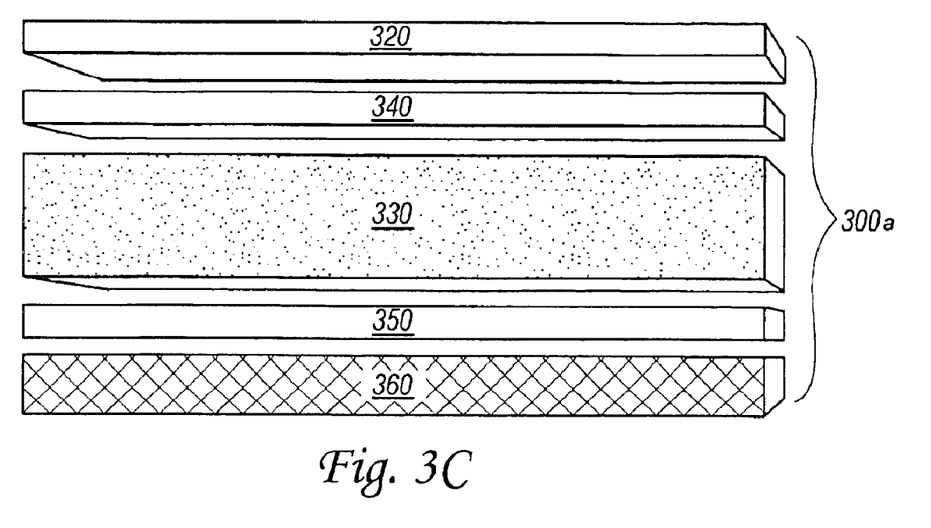
FIG. 3C is a vertical sectional view illustrating layers of a watch face having selectively changing backgrounds shown in accordance with an alternate embodiment of the invention employing a color changing layer.

Referring now to FIG. 3C, in an alternate arrangement 300a of the embodiment, the retardation and/or colored polarizer layer 340 may also be placed above the LCD 330 and under the top polarizer 320 or, in some instances, the top polarizer 320 itself may simply be a colored polarizer instead of a neutral polarizer.

Figure 4A:
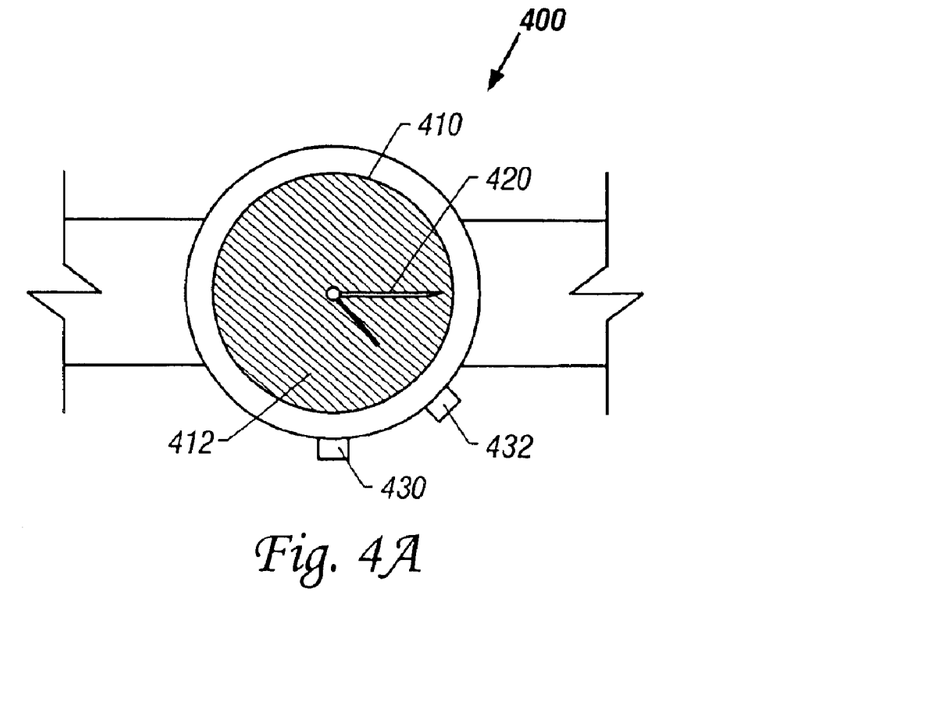
FIG. 4A is a top planar view of a watch face made in accordance with an embodiment of the invention disposed in a watch wherein the liquid crystal display in an "OFF" state thereby producing a first color.
Figure 4B:
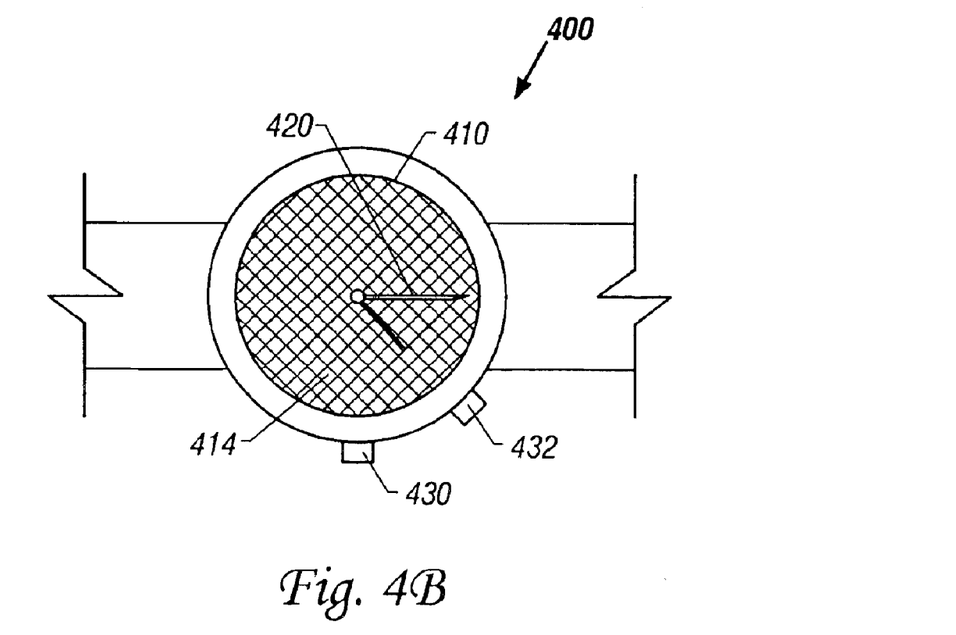
FIG. 4B is a top planar view of a watch face made in accordance with an embodiment of the invention disposed in a watch wherein the liquid crystal display in an "ON" state to produce a second color.

FIGS. 4A and 4B disclose an example of a watch utilizing the arrangements 300 described above for FIGS. 3A and 3B. A watch 400 has a watch face 410 with analog hands 420 disposed above the surface of face 410. To adjust the position of hands 420, a controller 430 may be provided for example. To selectively control the background color of face

410, a control actuator 432 may also be provided for example. A hole disposed through the layers of the watch face (not depicted) allows for the placement of a post for affixing watch hands 420 thereto. Thereby, watch hands 420 can be moved accordingly to indicate time.

As shown in FIG. 4A, watch face 410 has a first color 412. In this example, this is achieved using arrangement 300 in FIG. 3A. Therefore, the LCD in watch 400 is in the "OFF" state. Therefore, color 412 will appear as the color of film 340 because the incident light will be reflected off of the reflective polarizer film 350.

With FIG. 4B, watch face 410 has a second color 414. In this example, this color is achieved using arrangement 300 in FIG. 3B. As such, the LCD in watch 400 is in the "ON" state. Therefore, color 414 will appear as the color of surface 360 because the incident light will be pass through reflective polarizer film 350 and be reflected from surface 360. Although a watch is described here as an example for utilizing a background with selective color, other embodiments utilizing these arrangements are possible.

To control and facilitate the LCDs of the above embodiments, known electronics are understood to be incorporated as needed with the invention. This facilitates the color changes of the background and the controlling and driving electronics needed for the watch. These electronics can allow the color to change a predetermined pattern or frequency, such as switching from one color to another every two seconds, or giving the user the ability to select and statically display one of the colors.

Figure 5A:
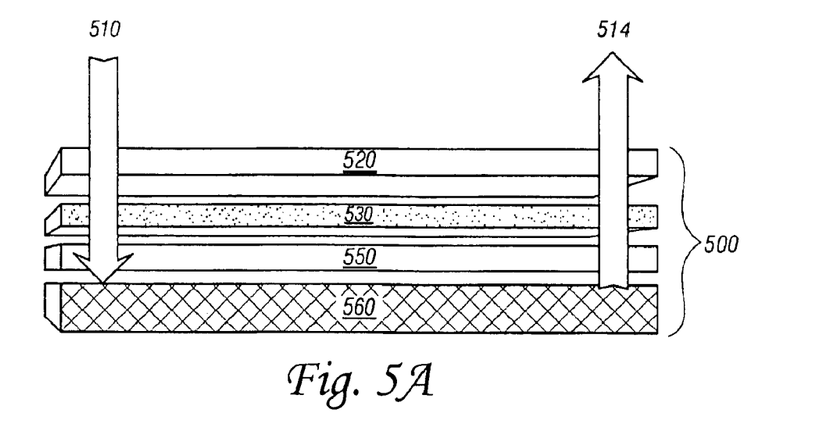
FIG. 5A is a vertical sectional view illustrating layers of a watch face having selectively changing backgrounds shown in accordance with an alternate embodiment of the invention featuring an electrically controlled birefringence (ECB) LCD.
Figure 5B:
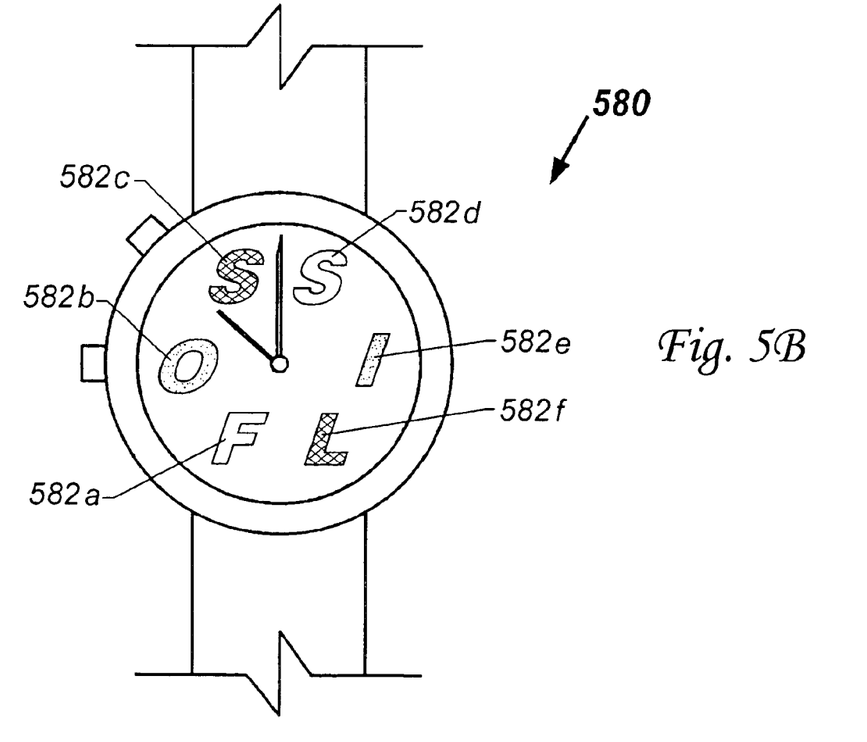
FIG. 5B is a top planar view of a watch face made in accordance with an embodiment of the invention disposed in a watch wherein an electrically controlled birefringence (ECB) LCD is used to display a variety of color segments.

Referring now to FIGS. 5A and 5B, in an additional arrangement 500 of the embodiment of the present invention, an Electronically Controlled Birefringence (ECB) LCD 530 is used in preference to the conventional LCDs 230 and 330 of arrangements 200 and 300, respectively. ECB LCDs makes use of an electric field to manipulate the birefingence of the liquid crystal. By altering the orientation of the liquid crystal with an electric field comprised of intermediate voltages, the ECB LCD can control the color of the reflected light. Varying an applied voltage causes the LCD to exhibit different colors on the display. A typical ECB LCD with neutral polarizers may be used to produce colors ranging from pink to green to dark blues. Different colored polarizers, colored reflectors, and retardation film layers may also be utilized to produce ECB LCDs that are capable of generating different color variation. Thus, ECB LCDs are capable of providing an entire gamut of colors within the visible spectrum. This permits the generation of a plurality of color choices for the background, rather than the simple choice between one or two colors. The electronics may also be modified to automatically or at user's selection produce a selected color at the intermediate voltages or produce a smooth gradation change between these different colors.

While voltage requirements are generally stated in terms of precise voltages (e.g., "OFF" voltage=0V, "ON" voltage= 4.0V), it is understood that the voltages required to trigger an "OFF" or "ON" state in a conventional LCD or ECB LCD need not be precise; but rather must be either below or above a particular voltage threshold. Thus, the voltages required to trigger an "OFF" or "ON" state in a conventional LCD can be varied across a spectrum of suitable intermediate voltages. For example, the first voltage (i.e., the voltage required to trigger an "OFF" state) is not a specific fixed voltage, but rather a voltage within a spectrum of suitable intermediate voltages. For example, in one embodiment, a first voltage could range between 0.0 V and 0.5 V. Similarly, the second voltage (i.e., the voltage required to trigger an "ON" state) is also not a specific fixed voltage, but rather a voltage within a spectrum of suitable intermediate voltages. For example, in one embodiment, a second voltage could range between 3.5 V and 4.5 V.

While the arrangements described above for backgrounds with selective color are particularly useful and desirous for watches, other applications are possible. For example, display signs, clocks, and various novelties could utilize a background with selective color. Further, it is advantageous that the background can have an iridescent appearance, unique patterns, and/or three-dimensional appearances to provide a variety. Additional displays for watches are possible wherein watch face is broken into segments. As shown in FIG. 5B, in an example of a watch 580 utilizing the arrangement 500 described in FIG. 5A, the watch face may also be segmented into a plurality of distinct colored segments or shapes, e.g., 580a–580f. Moreover, utilizing an ECB LCD 530 and layers of the watch face can be set so as to produce a different color in each segment of the watch face.

Figure 6A:
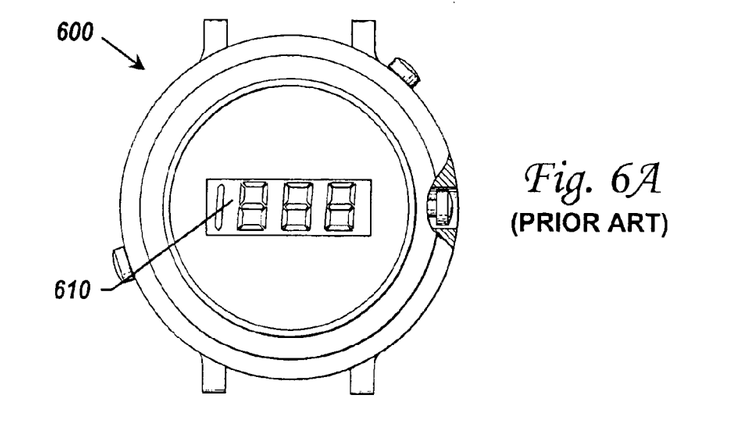
FIG. 6A is a top planar view of a prior art watch face featuring a LCD display.
Figure 6B:
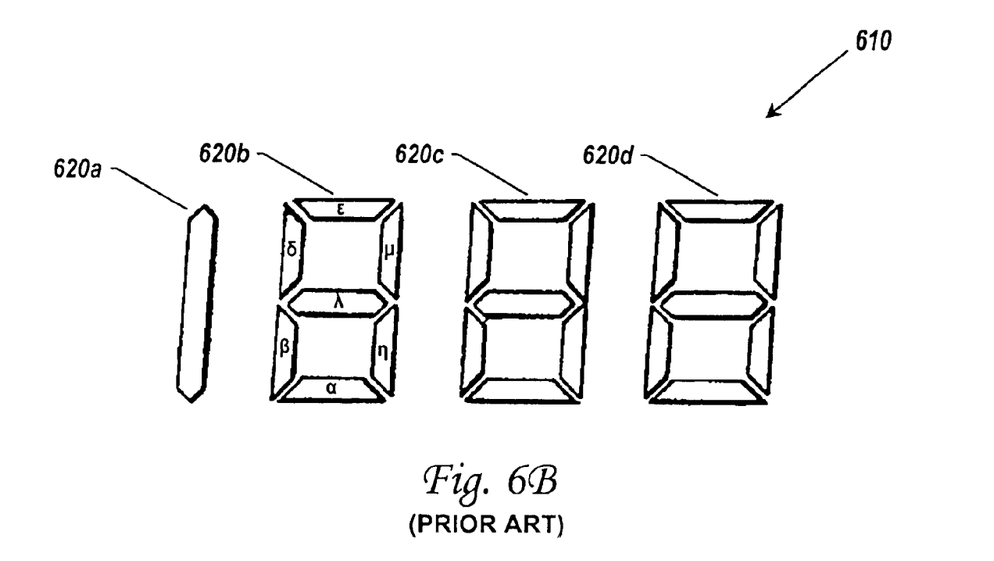
FIG. 6B is a top planar view of a prior art LCD display illustrating the invisible etched ITO (indium tin-oxide) segments that are etched in the interior of the glass in the visible area of LCD.

Referring now to FIGS. 6A and 6B, an example of a prior art timepiece device 600 is shown which includes an LCD digital display 610. The display 610 comprises a plurality of segmented displays, e.g., 620a, 620b, 620c, 620d, which are commonly referred to as "7 Segment LCD Displays." The 7-Segment LCD display is typical of conventional technology whereby LCDs are used to form alphanumeric letters and symbols. Small electrodes attached to discrete segments (e.g., $\alpha, \beta, \delta, \epsilon, \eta, \mu, \lambda$ in segmented display 620b) charge the TN liquid crystals and make the layers untwist so that light is not transmitting through the polarized film. Voltage applied to specific segment patterns create a wide variety of alphanumeric letters and symbols. For example, by applying voltage to the segment pattern ($\beta, \delta$) the number "3" is formed. Similarly, applying a voltage to the segment pattern ($\alpha, \epsilon$,) results in the letter "H".

Currently, the typical LCD digital watch displays either black segments on grey background (i.e., positive display) or grey segments on a black background (i.e., negative display). However, to enhance the marketability and functionality of watches and other consumer items incorporating digital displays, the ability to effectively exploit additional spectrums of color is vital.

The previously mentioned Brewer et al. '185 and '456 patents teach methodologies for incorporating a color changing LCD into a timepiece device. In addition to combining an analog display with a color changing LCD watchface, the Brewer et al. patents further disclose the combination of a color changing LCD with a digital time display incorporated therein. However, using a single color changing LCD to both display the digital readout and serve as a color changing background has several inherent limitations which correspondingly detract from visual acuity and aesthetics of the display. The limitations inherently arise from the process by which the LCD is constructed. For example, the lines used to connect the different LCD segments are etched in the interior of the glass in visible areas of the LCD using invisible etched indium tin-oxide (ITO). Thus, using a single color changing LCD to both display the digital readout and serve as a color changing background inevitably results in a series of lines going through the background which can never change color.

Additionally, the use of discrete segments to create displays of alphanumeric characters inherently limits the visual design characteristics of individual characters and symbols due to the characteristic line, which separates the discrete segments from one another.

Figure 7A:
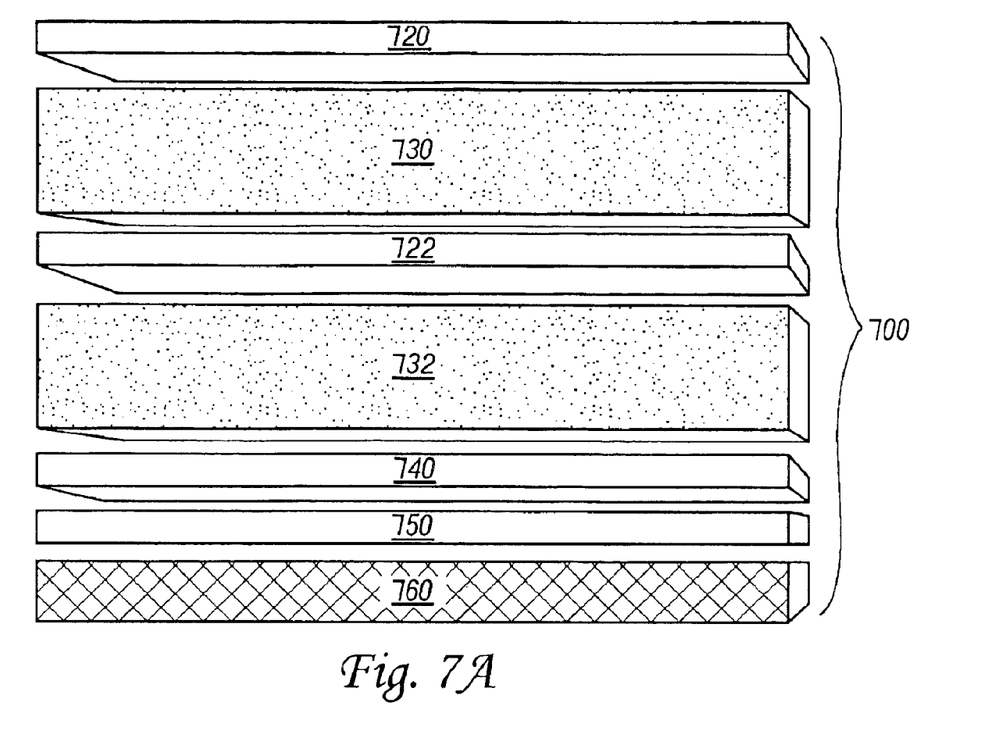
FIG. 7A is a vertical sectional view illustrating layers of a watch face having selectively changing backgrounds shown in accordance with an embodiment of the invention featuring a dual LCD arrangement.

The inventive solution of the present invention is the incorporation of a tandem arrangement of two LCDs into a single module. In one embodiment, one LCD is dedicated to serving as a color changing background and the other LCD includes the desired time display segments. Referring now to FIG. 7A, a preferred configuration of the present invention featuring a dual LCD arrangement 700 is illustrated. The arrangement 700 is comprised of a top polarizer layer 720 and a first LCD 730 disposed behind it, followed by a second LCD 732. In one embodiment, the two LCDs may be secured within the module with space in between them. In another embodiment, the two LCDs are bonded to each other with no air gap in order to insure the brightest display possible. Eliminating the air gap between the two LCDs significantly reduces the light lost due to reflections. In a preferred embodiment, an optical sealant 722 such as an epoxy indexed to match the index of refraction of the LCDs is used to bond the two LCDs to one another. A colored polarizer or retardation film 740 is disposed behind the second LCD 732, followed by a layer comprised of a reflective polarizer film 750, which in turn is followed by a reflective layer 760 which may comprise a dial background or a colored translucent screen with a reflector behind it. In a variant of the embodiment, a conventional absorptive polarizer may also be used in layer 750. In another variant of the embodiment, a clear reflector layer 760 and a colored top polarizer layer 720 may be used to produce the desired visual effect.

In a preferred embodiment of the arrangement 700, the first LCD 730 is segmented for digital display while the second LCD 732 is utilized to generate the display face background color. With this configuration the segments of the digital LCD 730 will display one color produced by presence of the colored polarizer layer (or no color polarizer layer which results in gray), and the background LCD 732 will display the color produced by whatever is produced behind the reflective polarizer 750. Moreover, while in its simplest form, the LCD 732 used to generate the display background color is comprised of a single segment representing a changing background, the present invention also envisions dividing the LCD 732 utilized to generate the display face background color into a plurality of discretely colored segments utilizing the methodologies discussed previously.

Figure 7B:
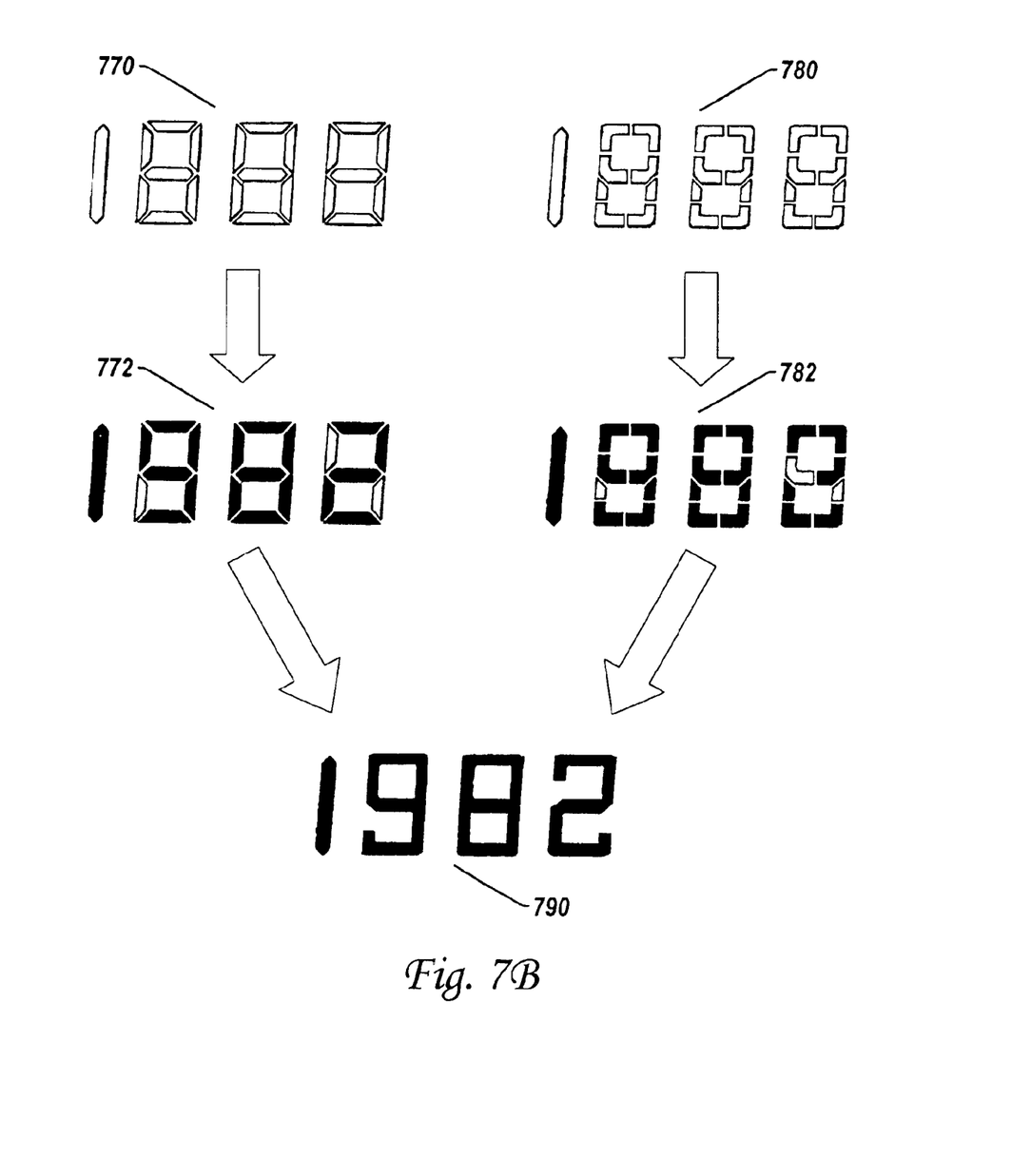
FIG. 7B illustrates an improvement in visual acuity resulting from the employment of a dual LCD arrangement in a display arranged in accordance with an embodiment of the present invention.

Additionally, in other configurations of the arrangement 700, the functionality of the dual LCDs 730, 732 may also be interchanged as deemed appropriate to enhance the visual aesthetics of the overall display. For example, the LCD 732 used to generate the display background color may also include a digital display which complements the digital display on the LCD 730 segmented for digital display. As shown in FIG. 7B, the segmented digital display 780 of LCD 732 is designed to complement the segmented digital display 770 of LCD 730. The digital display 780 is designed such that when the dual LCDs 730, 732 are properly aligned, the various individual segments of digital display 780 are arranged directly beneath the inherent gaps in the segmented digital display 770 of LCD 730. When activated, the digital display 782 complements digital display 707 resulting in the improved appearance of the combined digital display 790. It will also be appreciated, that such layering of complementary LCD digital displays greatly enhances the ability of designers to employ more complex fonts and symbology.

In a most basic embodiment of the present invention featuring dual LCDs, the individual segments of the first LCD 730 display a first color and the second LCD 732 displays complementary individual segments of the first color and a background of a second color. Currently, LCDs are produced which typically are either colored segments on a grey background (i.e., positive image displays) or gray segments on a colored background (i.e., negative image displays). In another embodiment of the present invention, the invention may further include switching means whereby the first and second displayed colors may be inverted or changed. A microprocessor of conventional design may be incorporated into the display to control the electrical power applied to the first and second LCDs 730, 732. For example, the voltage applied to the first LCD 730 may alternate between a first voltage and a second voltage which correspond to the "OFF" and "ON" states discussed previously, which correspondingly results in the activated portions of the first LCD 730 either rotating or not rotating polarized light. Similarly, the voltage applied to the second LCD 732 may alternate between a third voltage and a fourth voltage which correspond to the "OFF" and "ON" states discussed previously, which correspondingly results in the activated portions of the second LCD 732 either rotating or not rotating polarized light. Thus, the switching means of the present invention allows the dual LCD arrangement 700 to change from positive to a negative image display. Additionally, the switching means may be electronically actuated in a preprogrammed fashion or manually actuated using a control actuator like the actuator 432 shown in FIGS. 4A and 4B.

Those skilled in the art can recognize how this inventive arrangement will result in different polarization rotations of light depending where "OFF" and "ON" segments overlap between the two layered displays and the resulting color depending the various polarizer and coloring layers. In one orientation some of the additional coloring layers aren't necessary to make the invention functional, but are desired in a preferred embodiment where there are different colored segments and backgrounds. In some cases, the colored background may produce maximum color difference between a first and second color, but while segments are a first color the background may also be voltage controlled to produce an intermediate color (e.g., red segments on either a blue background or purple (intermediate color) background). In other embodiments, one or more of the polarizer layers may be removed to produce lighter color gradiations.

With regard to embodiments of the present invention which include segmented LCD displays, an additional feature is a pattern selection means used in conjunction with the previously discussed switching means. The pattern selection means controls the selection of a pattern of segments to which voltage is applied. The pattern selection means may be programmed to select voltage patterns in a preprogrammed electronically controlled manner (e.g., in one embodiment a pattern selection means may simply comprise an electronic clocking mechanism used in conjunction with the switching means to create a digital time display) or manually actuated using a control actuator similar to the actuator 432 shown in FIGS. 4A and 4B. Moreover, the use of complementary LCD displays allows a voltage pattern displayed on one LCD to complement the pattern displayed on the other LCD. Thus, the ability to create more complicated and diverse alphanumeric characters and symbols is greatly enhanced.

Another feature of the present invention includes a voltage control means whereby the voltage applied to a particular LCD may be selectively varied within the spectrum of suitable intermediate voltages to trigger the "OFF" and "ON" states mentioned previously. Thus, the voltages required to trigger an "OFF" or "ON" state (e.g., the first and third voltages and the second and fourth voltages, respectively) may be selectively adjusted to any specific voltage within the particular spectrum of suitable intermediate voltages. This is particularly applicable to embodiments of the invention utilizing ECB LCDs wherein the selection of different specific intermediate voltages causes the LCD to exhibit different colors. The voltage control means may be programmed to vary the voltage applied in a preprogrammed electronically controlled manner or manually actuated using a control actuator like the actuator 432 shown in FIGS. 4A and 4B.

Figure 8:
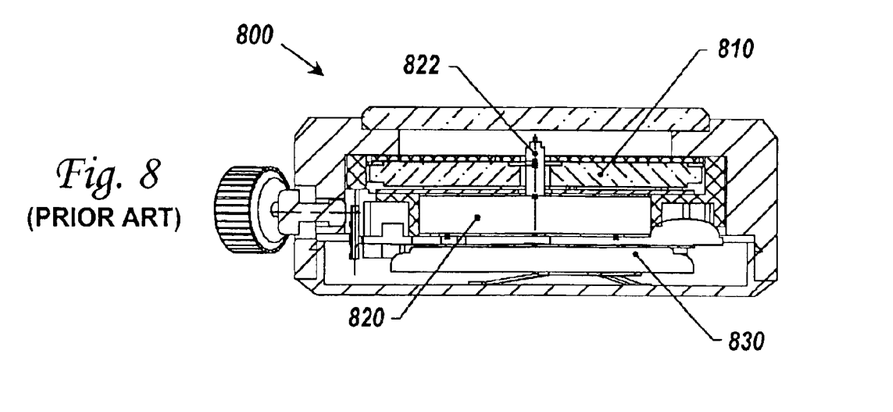
FIG. 8 is a cross-sectional view of a prior art display device illustrating the conventional positioning of the battery in tandem with the PCB.

Another feature of the present invention is directed at the physical ergonomics of the timepiece itself whereby a novel configuration of the internal components of the timepiece of the present invention result in a significant reduction in the thickness of the subject timepiece, thereby enhancing the comfort of the individual wearing the timepiece. Referring now to FIG. 8, an example of a prior art time piece is shown, which illustrates the conventional arrangement 800 of internal watch components. Typically, the components are arranged in a stacked assembly comprising an LCD display 810, followed by a printed circuit board (PCB) assembly 820, which in turn is followed by a battery 830. In this arrangement, the thickness of the resulting timepiece is dictated by the sum of the thicknesses of the stacked components. This is particularly problematic when the an analog watch movement 822 is also incorporated into the display by drilling a hole through the LCD display 810 to accommodate the analog watch hand movement 820. The resulting thickness of the time piece detracts from the physical ergonomics watch.

Figure 9A:
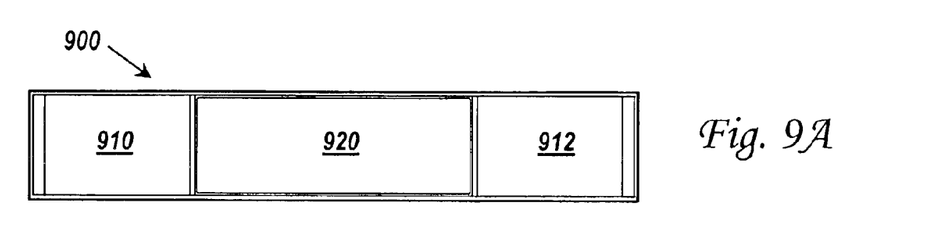
FIG. 9A is a lateral cross-sectional view of an embodiment of the present invention illustrating the novel configuration of the internal components of the display and power source.
Figure 9B:
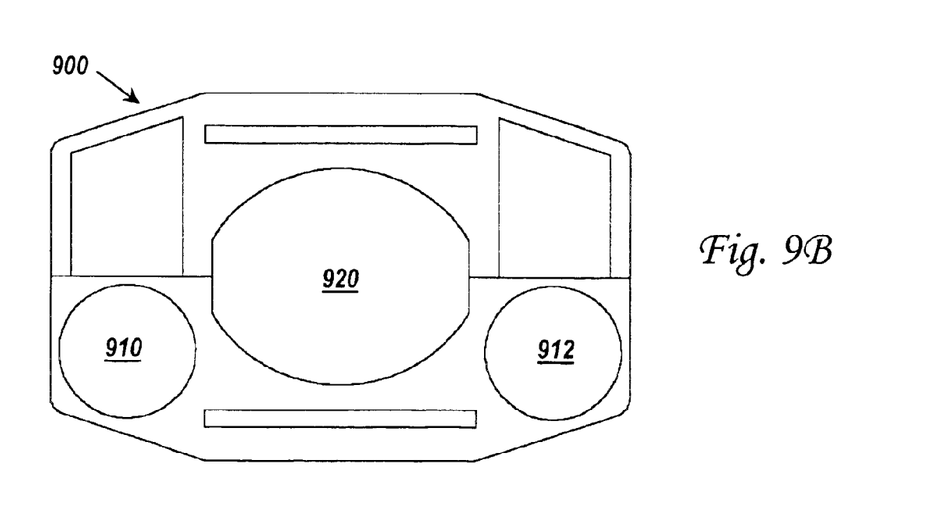
FIG. 9B is a top planar view of a watch face made in accordance with an embodiment of the present invention illustrating the novel configuration of the internal component of the display and power source.

As shown in FIGS. 9A and B, the novel configuration 900 of the internal components of the time piece of the present invention comprises positioning two smaller sized batteries 910, 912 alongside the PCB and LCD display 920 instead of the conventional arrangement 800 whereby a larger battery 830 is placed directly behind the PCB 820. For example, in one embodiment, instead of using the typical single 3 volt battery used in the conventional arrangement 800, the time piece of the present invention employs two (2) 1.5 volt silver oxide batteries alongside the PCB and LCD display 920. Thus, this novel configuration 900 allows for an overall thinner movement, thereby resulting in a thinner more comfortable watch without detracting from the functionality of the watch.

It is understood that other modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A watch face with selective backgrounds comprising:
   a polarizer layer for polarizing light passing therethrough;
   a liquid crystal display disposed beneath the polarizer layer wherein the liquid crystal display selectively rotates or does not rotate polarized light;
   a neutral reflective polarizer layer located beneath the liquid crystal display and positioned in a first orientation relative to said polarizer layer, wherein rotated light reflects off the neutral reflective polarizer layer producing a first background on the watch face and non-rotated light is transmitted through the neutral reflective polarizer layer; and
   a reflective non-polarized layer disposed beneath the neutral reflective polarizer layer wherein the light passed through the neutral reflective polarizer layer reflects off the non-polarized reflective layer producing a second background on the watch face.

2. The watch face of claim 1 wherein the polarizer layer comprises a neutral polarizer.

3. The watch face of claim 1 wherein the polarizer layer comprises a colored polarizer.

4. The watch face of claim 1 wherein the liquid crystal display is a twisted nematic liquid crystal display.

5. The watch face of claim 1 wherein the liquid crystal display is an electronically controlled birefringence liquid crystal display.

6. The watch face of claim 1 wherein the neutral reflective polarizer layer is positioned in a second orientation relative to said polarizer layer, wherein non-rotated light reflects off the reflective polarizer layer producing the first background on the watch face and rotated light is transmitted through the reflective polarizer layer.

7. The watch face of claim 1 wherein the reflective non-polarized layer is a patterned surface.

8. The watch face of claim 1 wherein the reflective non-polarized layer is a colored surface.

9. The watch face of claim 7 wherein the reflective non-polarized layer is a colored surface.

10. The watch face of claim 1 wherein the reflective non-polarized layer is a mirrored surface.

11. The watch face of claim 7 wherein the patterned surface is an analog clock face.

12. The watch face of claim 1 wherein the first and second background are colored.

13. The watch face of claim 1 wherein the first background is a first color and the second background is a second color.

14. The watch face of claim 1 wherein the first background is a silvered mirror.

15. The watch face of claim 1 further comprising a color changing layer disposed directly above or directly below the liquid crystal display.

16. The watch face of claim 15 wherein the color changing layer comprises a colored polarizer.

17. The watch face of claim 15 wherein the color changing layer comprises a retardation film.

18. The watch face of claim 1 wherein said watch face includes a hole extending axially therethrough to provide for movement of analog time watch hands.

19. The watch face of claim 1 wherein said watch face is disposed within a watch module.

20. The watch module of claim 19 wherein said module is round and said watch face is octagonal.

21. The watch face of claim 1 further comprising voltage switching means, wherein said switching means controls a voltage applied to said liquid crystal display.

22. The watch face of claim 21 wherein said voltage switching means is electronically actuated.

23. The watch face of claim 21 wherein said voltage switching means is manually actuated.

24. The watch face of claim 21 wherein said voltage switching means alternates between a first and a second voltage.

25. The watch face of claim 24 wherein said first voltage produces the first background and said second voltage produces the second background.

26. The watch face of claim 25 further comprising means for adjusting said second voltage.

27. The watch face of claim 26 wherein said means for adjusting is electronically actuated.

28. The watch face of claim 26 wherein said means for adjusting is manually actuated.

29. A watch face with selective backgrounds comprising:
a polarizer layer for polarizing light passing therethrough;
a liquid crystal display disposed beneath the polarizer layer wherein the liquid crystal display is divided into a plurality of distinct segments, wherein each segment selectively rotates or does not rotate polarized light;
a neutral reflective polarizer layer located beneath the liquid crystal display and positioned in a first orientation relative to said polarizer layer, wherein rotated light reflects off the neutral reflective polarizer layer producing a first background on the watch face and non-rotated light is transmitted through the neutral reflective polarizer layer; and
a reflective non-polarized layer disposed beneath the neutral reflective polarizer layer wherein the light passed through the neutral reflective polarizer layer reflects off the reflective non-polarized layer producing a second background on the watch face.

30. The watch face of claim 29 wherein said plurality of distinct segments comprise a digital time display.

31. The watch face of claim 29 wherein the polarizer layer comprises a neutral polarizer.

32. The watch face of claim 29 wherein the polarizer layer comprises a colored polarizer.

33. The watch face of claim 29 wherein the liquid crystal display is a twisted nematic liquid crystal display.

34. The watch face of claim 29 wherein the liquid crystal display is an electronically controlled birefringence liquid crystal display.

35. The watch face of claim 29 wherein the neutral reflective polarizer layer is positioned in a second orientation relative to said polarizer layer, wherein non-rotated light reflects off the neutral reflective polarizer layer producing the first background on the watch face and rotated light is transmitted through the neutral reflective polarizer layer.

36. The watch face of claim 29 wherein the reflective non-polarized layer is a patterned surface.

37. The watch face of claim 29 wherein the reflective non-polarized layer is a colored surface.

38. The watch face of claim 29 wherein the reflective non-polarized layer is a colored surface.

39. The watch face of claim 29 wherein the reflective non-polarized layer is a mirrored surface.

40. The watch face of claim 36 wherein the patterned surface is an analog clock face.

41. The watch face of claim 29 wherein the first and second background are colored.

42. The watch face of claim 29 wherein the first background is a first color and the second background is a second color.

43. The watch face of claim 29 wherein the first background is a silvered mirror.

44. The watch face of claim 29 further comprising a color changing layer disposed directly above or directly below the liquid crystal display.

45. The watch face of claim 44 wherein the color changing layer comprises a colored polarizer.

46. The watch face of claim 44 wherein the color changing layer comprises a retardation film.

47. The watch face of claim 29 wherein the watch face facilitates analog or digital time display.

48. The watch face of claim 29 wherein the watch face includes a hole extending axially therethrough to provide for analog time movement of watch hands.

49. The watch face of claim 29 wherein the watch face is disposed within a watch module.

50. The watch module of claim 49 wherein said module is round and said watch face is octagonal.

51. The watch face of claim 29 further comprising a voltage switching means, wherein said voltage switching means controls a voltage selectively applied to at least one of a plurality of segment patterns, wherein each pattern is comprised of at least one of the plurality of distinct segments.

52. The watch face of claim 51 wherein said voltage switching means alternates the voltage between a first voltage and a second voltage.

53. The watch face of claim 52 wherein said first voltage causes each distinct segment in the at least one of said plurality of segment patterns to rotate polarized light and said second voltage causes each distinct segment in the at least one of said plurality of segment patterns to not rotate polarized light.

54. The watch face of claim 51 wherein said voltage switching means is electronically actuated.

55. The watch face of claim 51 wherein said voltage switching means is manually actuated.

56. The watch face of claim 52 further comprising means for adjusting said second voltage.

57. The watch face of claim 56 wherein said means for adjusting is electronically actuated.

58. The watch face of claim 56 wherein said means for adjusting is manually actuated.

59. The watch face of claim 51 further comprising a pattern selection means, wherein said selecting means controls the selection of at least one of the plurality of patterns.

60. The watch face of claim 59 wherein said pattern selection means is electronically actuated.

61. The watch face of claim 59 wherein said pattern selection means is manually actuated.

* * * * *

UNITED STATES PATENT AND TRADEMARK OFFICE
CERTIFICATE OF CORRECTION

PATENT NO. : 6,982,931 B2  Page 1 of 1
APPLICATION NO. : 10/087245
DATED : January 3, 2006
INVENTOR(S) : Donald R. Brewer and Diarmiud John St. Colum Bland It is certified that error appears in the above-identified patent and that said Letters Patent is hereby corrected as shown below:

Column 12, line 4, "reflects off the non-polarized reflective layer producing" should be corrected to read "reflects off the reflective non-polarized layer producing"

Column 12, line 49, claim no. 20, "The watch module of claim 19" should be corrected to read "The watch face of claim 19"

Column 14, line 18, claim no. 50, "The watch module of claim 49" should be corrected to read "The watch face of claim 49"

Signed and Sealed this

Twenty-ninth Day of August, 2006

JON W. DUDAS
*Director of the United States Patent and Trademark Office*